US011767862B2

(12) United States Patent
Tomioka

(10) Patent No.: US 11,767,862 B2
(45) Date of Patent: Sep. 26, 2023

(54) CONSTRUCTION MACHINE

(71) Applicant: SUMITOMO HEAVY INDUSTRIES CONSTRUCTION CRANES CO., LTD., Tokyo (JP)

(72) Inventor: Hiroyuki Tomioka, Aichi (JP)

(73) Assignee: SUMITOMO HEAVY INDUSTRIES CONSTRUCTION CRANES CO., LTD., Tokyo (JP)

( * ) Notice: Subject to any disclaimer, the term of this patent is extended or adjusted under 35 U.S.C. 154(b) by 543 days.

(21) Appl. No.: 17/114,060

(22) Filed: Dec. 7, 2020

(65) Prior Publication Data

US 2021/0088058 A1 Mar. 25, 2021

Related U.S. Application Data

(63) Continuation of application No. PCT/JP2019/022697, filed on Jun. 7, 2019.

(30) Foreign Application Priority Data

Jun. 8, 2018 (JP) ................ 2018-110566

(51) Int. Cl.
*F15B 19/00* (2006.01)
*B66C 13/16* (2006.01)
*B66C 13/20* (2006.01)

(52) U.S. Cl.
CPC ............ *F15B 19/005* (2013.01); *B66C 13/16* (2013.01); *B66C 13/20* (2013.01);
(Continued)

(58) Field of Classification Search
CPC ...... G01F 1/24; G01F 1/26; E02F 9/00; E02F 3/435; E02F 9/2225; E02F 9/2296;
(Continued)

(56) References Cited

U.S. PATENT DOCUMENTS 3,846,774 A 11/1974 Thorbard et al.
7,082,758 B2 8/2006 Kageyama et al.
(Continued)

FOREIGN PATENT DOCUMENTS

DE 29823702 U1 11/1999
JP S49-48350 A 5/1974
(Continued)

OTHER PUBLICATIONS

International Search Report issued in Application No. PCT/JP2019/022697, dated Aug. 20, 2019.

*Primary Examiner* — Brandi N Hopkins
(74) *Attorney, Agent, or Firm* — Michael Best & Friedrich LLP

(57) ABSTRACT

Provided is a construction machine including a hydraulic system having a hydraulic pump, and a first hydraulic actuator and a second hydraulic actuator which are driven by hydraulic oil supplied from the hydraulic pump. The construction machine includes a first flow rate detector that detects a flow rate of drain hydraulic oil discharged from the first hydraulic actuator, a second flow rate detector that detects a flow rate of drain hydraulic oil discharged from the second hydraulic actuator, and an abnormality determination unit that determines abnormality of the first hydraulic actuator, based on a detection signal from the first flow rate detector, and determines abnormality of the second hydraulic actuator, based on a detection signal from the second flow rate detector. The first flow rate detector and the second flow rate detector each have a moving body.

12 Claims, 13 Drawing Sheets

(52) U.S. Cl.
CPC . *F15B 2211/632* (2013.01); *F15B 2211/6343* (2013.01); *F15B 2211/857* (2013.01)

(58) Field of Classification Search
CPC ......... E02F 9/2221; E02F 9/2235; E02F 9/22; E02F 9/2217; E02F 9/2203; E02F 9/2228; E02F 9/20; E02F 9/2264; B01D 35/02; B01D 35/143; F15B 20/00; F15B 21/04; F15B 11/044; F15B 19/005; B62D 5/065; B66C 13/20; B66C 23/88; B66D 1/44; F16H 61/40; B66F 9/22
See application file for complete search history.

(56) References Cited

U.S. PATENT DOCUMENTS

| | | | |
|---|---|---|---|
| 2008/0011076 | A1 | 1/2008 | Buck et al. |
| 2012/0041663 | A1* | 2/2012 | Suzuki .................. E02F 9/267 701/102 |
| 2013/0218422 | A1* | 8/2013 | Nishitani ............. E02F 9/2075 701/50 |
| 2017/0356163 | A1* | 12/2017 | Hita ......................... E02F 9/26 |
| 2019/0211528 | A1* | 7/2019 | Hita .................. H01M 10/443 |

FOREIGN PATENT DOCUMENTS

| | | |
|---|---|---|
| JP | S59-083811 A | 5/1984 |
| JP | S61-024805 A | 2/1986 |
| JP | 2005-330935 A | 12/2005 |
| JP | 2012-041767 A | 3/2012 |
| JP | 2013-076444 A | 4/2013 |
| JP | 2014-105766 A | 6/2014 |
| WO | WO-2016/155693 A1 | 10/2016 |

\* cited by examiner

⇒ : FLOW OF DRAIN HYDRAULIC OIL

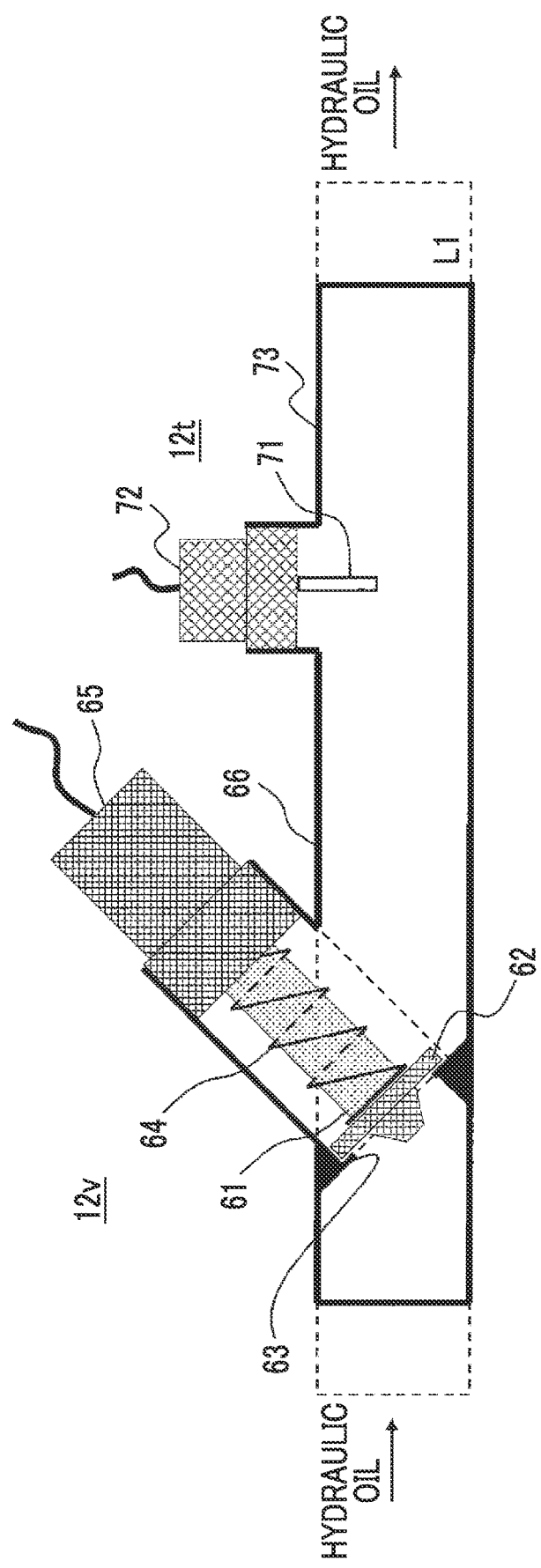

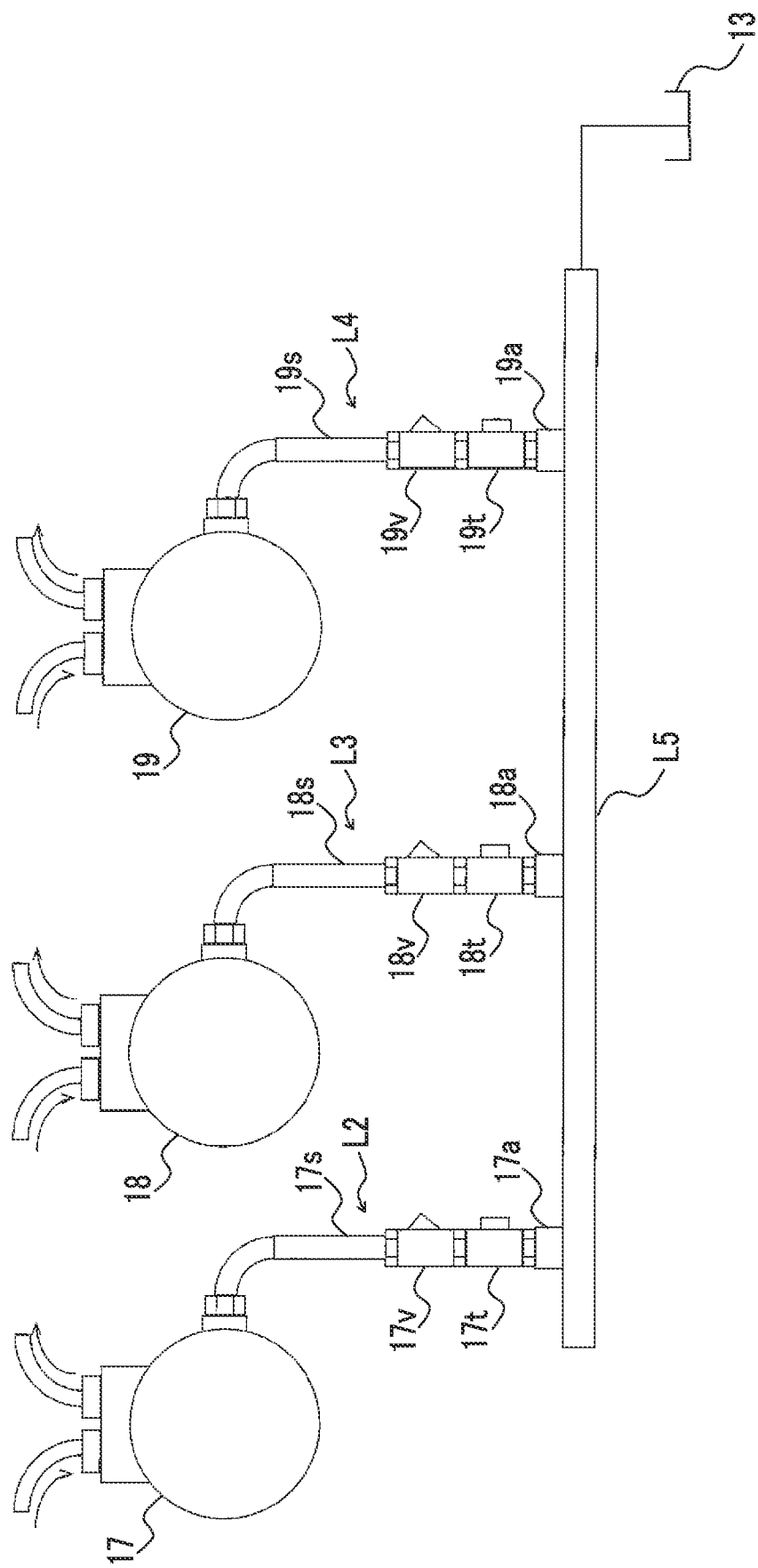

FIG. 8

CORRECTION VALUE TABLE (70)

| | | DRAIN TEMPERATURE | | | | |
|---|---|---|---|---|---|---|
| | | $T_1$ | $T_2$ | $T_3$ | $T_4$ | $T_5$ |
| DRAIN FLOW RATE | $V_1$ | $Q_{11}$ | $Q_{12}$ | $Q_{13}$ | $Q_{14}$ | $Q_{15}$ |
| | $V_2$ | $Q_{21}$ | $Q_{22}$ | $Q_{23}$ | $Q_{24}$ | $Q_{25}$ |
| | $V_3$ | $Q_{31}$ | $Q_{32}$ | $Q_{33}$ | $Q_{34}$ | $Q_{35}$ |
| | $V_4$ | $Q_{41}$ | $Q_{42}$ | $Q_{43}$ | $Q_{44}$ | $Q_{45}$ |
| | $V_5$ | $Q_{51}$ | $Q_{52}$ | $Q_{53}$ | $Q_{54}$ | $Q_{55}$ |

FIG. 9
DATA SHEET (DS1)

| | TARGET DEVICE | TIME t1 | TIME t2 | ... | ALLOWABLE VALUE |
|---|---|---|---|---|---|
| DRAIN TEMPERATURE SENSOR (12t) | HYDRAULIC PUMP (12) | Td11 | Td12 | ... | — |
| DRAIN TEMPERATURE SENSOR (17t) | TRAVELING MOTOR (17) | Td21 | Td22 | ... | — |
| DRAIN TEMPERATURE SENSOR (18t) | DERRICKING MOTOR (18) | Td31 | Td32 | ... | — |
| DRAIN TEMPERATURE SENSOR (19t) | HOISTING MOTOR (19) | Td41 | Td42 | ... | — |
| DRAIN FLOW RATE CORRECTION VALUE Qp | HYDRAULIC PUMP (12) | Qp11 | Qp12 | ... | $\Delta Qcp$ |
| DRAIN FLOW RATE CORRECTION VALUE Qt | TRAVELING MOTOR (17) | Qt21 | Qt22 | ... | $\Delta Qct$ |
| DRAIN FLOW RATE CORRECTION VALUE Qh | DERRICKING MOTOR (18) | Qh31 | Qh32 | ... | $\Delta Qch$ |
| DRAIN FLOW RATE CORRECTION VALUE Qw | HOISTING MOTOR (19) | Qw41 | Qw42 | ... | $\Delta Qcw$ |
| ROTATION SPEED SENSOR (12r) | HYDRAULIC PUMP (12) | Ra11 | Ra12 | ... | — |
| ROTATION SPEED SENSOR (17r) | TRAVELING MOTOR (17) | Ra21 | Ra22 | ... | — |
| ROTATION SPEED SENSOR (18r) | DERRICKING MOTOR (18) | Ra31 | Ra32 | ... | — |
| ROTATION SPEED SENSOR (19r) | HOISTING MOTOR (19) | Ra41 | Ra42 | ... | — |
| INTERNAL PRESSURE SENSOR (12p) | HYDRAULIC PUMP (12) | Pi11 | Pi12 | ... | — |
| INTERNAL PRESSURE SENSOR (17p) | TRAVELING MOTOR (17) | Pi21 | Pi22 | ... | — |
| INTERNAL PRESSURE SENSOR (18p) | DERRICKING MOTOR (18) | Pi31 | Pi32 | ... | — |
| INTERNAL PRESSURE SENSOR (19p) | HOISTING MOTOR (19) | Pi41 | Pi42 | ... | — |

FIG. 11

DATA SHEET (DS2)

| | TARGET DEVICE | TIME t1 | TIME t2 | ... | ALLOWABLE VALUE |
|---|---|---|---|---|---|
| HYDRAULIC OIL TANK TEMPERATURE SENSOR (43) | HYDRAULIC OIL TANK (13) | Ts11 | Ts12 | ... | — |
| DRAIN FLOW RATE CORRECTION VALUE Qp | HYDRAULIC PUMP (12) | Qp11 | Qp12 | ... | ΔQcp |
| DRAIN FLOW RATE CORRECTION VALUE Qt | TRAVELING MOTOR (17) | Qt21 | Qt22 | ... | ΔQct |
| DRAIN FLOW RATE CORRECTION VALUE Qh | DERRICKING MOTOR (18) | Qh31 | Qh32 | ... | ΔQch |
| DRAIN FLOW RATE CORRECTION VALUE Qw | HOISTING MOTOR (19) | Qw41 | Qw42 | ... | ΔQcw |
| ROTATION SPEED SENSOR (12r) | HYDRAULIC PUMP (12) | Ra11 | Ra12 | ... | — |
| ROTATION SPEED SENSOR (17r) | TRAVELING MOTOR (17) | Ra21 | Ra22 | ... | — |
| ROTATION SPEED SENSOR (18r) | DERRICKING MOTOR (18) | Ra31 | Ra32 | ... | — |
| ROTATION SPEED SENSOR (19r) | HOISTING MOTOR (19) | Ra41 | Ra42 | ... | — |
| INTERNAL PRESSURE SENSOR (12p) | HYDRAULIC PUMP (12) | Pi11 | Pi12 | ... | — |
| INTERNAL PRESSURE SENSOR (17p) | TRAVELING MOTOR (17) | Pi21 | Pi22 | ... | — |
| INTERNAL PRESSURE SENSOR (18p) | DERRICKING MOTOR (18) | Pi31 | Pi32 | ... | — |
| INTERNAL PRESSURE SENSOR (19p) | HOISTING MOTOR (19) | Pi41 | Pi42 | ... | — |

CONSTRUCTION MACHINE

RELATED APPLICATIONS

The contents of Japanese Patent Application No. 2018-110566, and of International Patent Application No. PCT/JP2019/022697, on the basis of each of which priority benefits are claimed in an accompanying application data sheet, are in their entirety incorporated herein by reference.

BACKGROUND

Technical Field

Certain embodiments of the present invention relate to a construction machine such as a crane, and particularly relates to a technique for determining whether or not a hydraulic actuator is abnormal.

Description of Related Art

As a related art in the present technical field, for example, the related art discloses a hydraulic system configured as follows. "In a case where only one of hydraulic actuators is manipulated, a CPU determines whether or not a drain flow rate detected by a flow rate sensor exceeds a predetermined threshold value. When the CPU determines that the detected drain flow rate exceeds the threshold value, the CPU determines that the hydraulic actuator is abnormal (refer to Abstract).

SUMMARY

According to an embodiment of the present invention, there is provided a construction machine including a hydraulic system having a hydraulic pump, and a first hydraulic actuator and a second hydraulic actuator which are driven by hydraulic oil supplied from the hydraulic pump. The construction machine includes a first flow rate detector that detects a flow rate of drain hydraulic oil discharged from the first hydraulic actuator, a second flow rate detector that detects a flow rate of drain hydraulic oil discharged from the second hydraulic actuator, and an abnormality determination unit that determines abnormality of the first hydraulic actuator, based on a detection signal from the first flow rate detector, and determines abnormality of the second hydraulic actuator, based on a detection signal from the second flow rate detector. The first flow rate detector and the second flow rate detector each have a moving body disposed inside a flow path of the drain hydraulic oil and biased in a direction of blocking a flow of the drain hydraulic oil, and an output unit that outputs a detection signal according to a movement amount of the moving body.

BRIEF DESCRIPTION OF THE DRAWINGS

FIG. 4 is a view illustrating a configuration of the drain flow rate sensor and a drain temperature sensor.

FIG. 5 is a view illustrating a configuration of a flow path of the drain hydraulic oil from a hydraulic motor to a hydraulic oil tank.

FIG. 8 is a configuration diagram of a correction value table.

FIG. 9 is a configuration diagram of a data sheet.

FIG. 11 is a configuration diagram of a data sheet according to Modification Example 1.

DETAILED DESCRIPTION

In the related art, one flow rate sensor is provided in a drain flow path where drains of a plurality of hydraulic actuators merge. Consequently, when the plurality of hydraulic actuators are driven at the same time (during combined manipulation), it is not possible to determine which hydraulic actuator is abnormal.

It is desirable to provide a construction machine which can determine which of a plurality of hydraulic actuators is abnormal.

According to the present invention, it is possible to determine which of a plurality of hydraulic actuators is abnormal. Tasks, configurations, and advantageous effects other than those described above will be clarified by description of the following embodiment.

Hereinafter, an embodiment of the present invention will be described with reference to the drawings.

Figure 1:
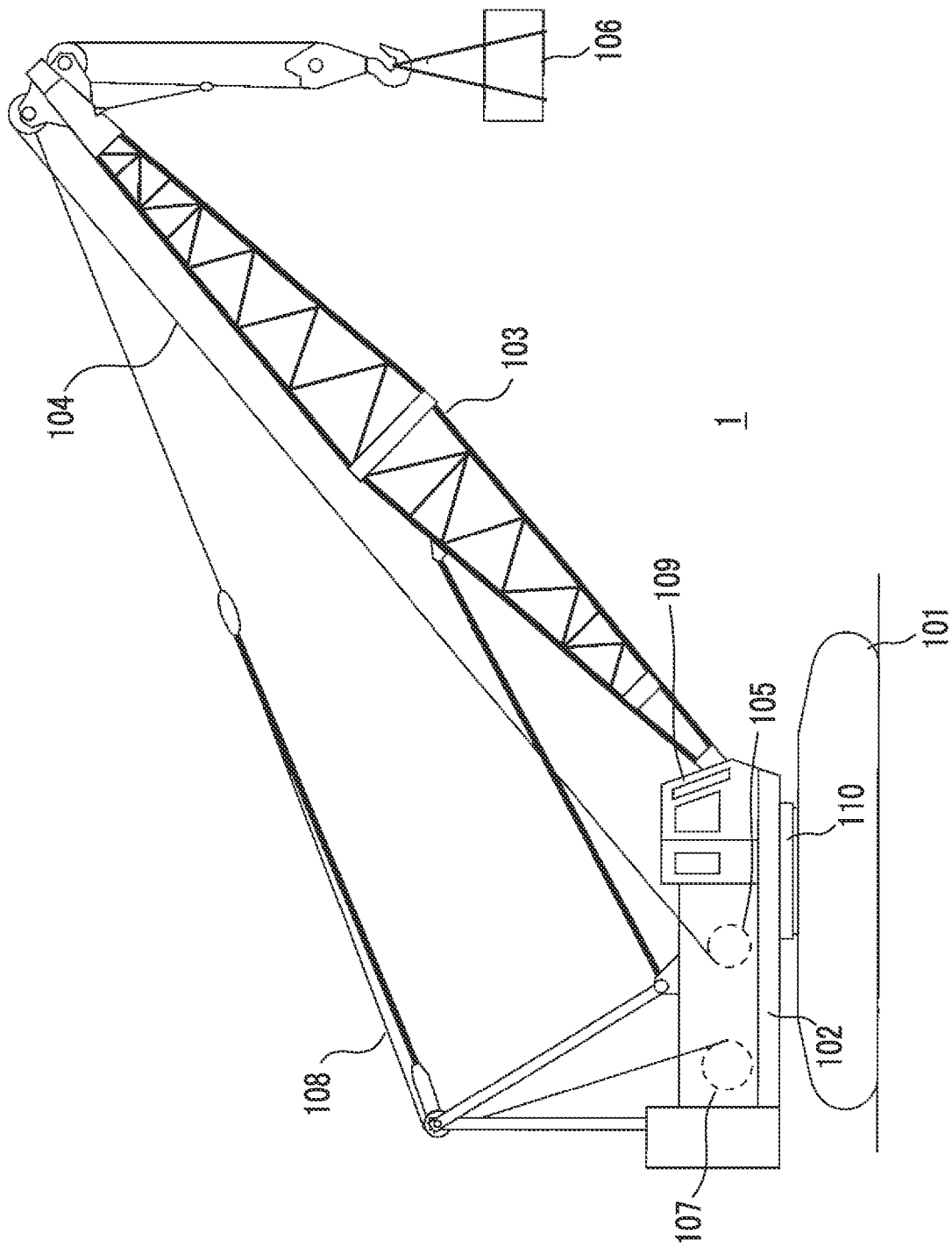
FIG. 1 is an external side view of a mobile crane which is an example of a construction machine according to an embodiment of the present invention.

FIG. 1 is an external side view of a mobile crane which is an example of a construction machine according to an embodiment of the present invention. As illustrated in FIG. 1, a mobile crane (hereinafter, simply referred to as a crane) 1 has a track-type lower traveling body 101, a rotating platform 102 mounted on the lower traveling body 101 to be capable of turning via a turning ring 110, and a boom 103 supported by the rotating platform 102 to be capable of derricking. A hoisting drum 105 is mounted on the rotating platform 102, and a hoisting rope 104 is hoisted or lowered by driving the hoisting drum 105 so that a suspended load 106 is raised and lowered. In addition, a derricking drum 107 is mounted on the rotating platform 102, and a derricking rope 108 is hoisted or lowered by driving the derricking drum 107 so that the boom 103 performs a derricking operation. The reference numeral 109 represents a cab of the crane 1 provided on the rotating platform 102.

Figure 2:
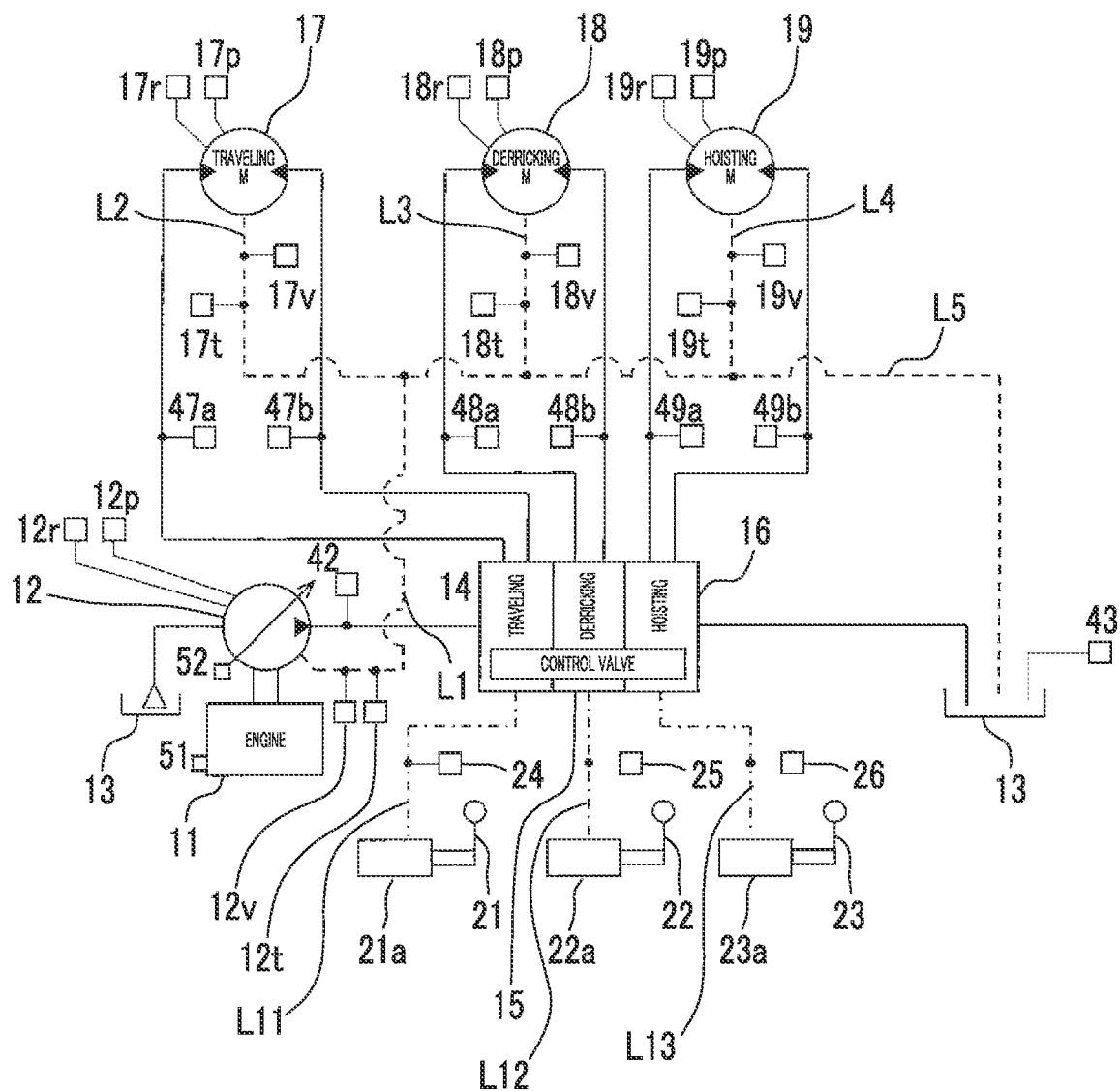
FIG. 2 is a view illustrating an internal configuration of the crane.

FIG. 2 is a view illustrating an internal configuration of the crane 1. As illustrated in FIG. 2, the crane 1 includes an engine 11, a hydraulic pump 12 driven by the engine 11, a hydraulic oil tank 13 that stores hydraulic oil, hydraulic actuators (a traveling motor 17, a derricking motor 18, and a hoisting motor 19) driven by pressure oil (hydraulic oil) supplied from the hydraulic pump 12, and control valves 14, 15, and 16 provided between each of the hydraulic actuators 17, 18, and 19 and the hydraulic pump 12 to switch flowing directions of the hydraulic oil. In FIG. 2, a turning motor which is a hydraulic motor for driving the turning ring 110 is omitted in the illustration.

The hydraulic pump 12 is a variable capacity-type hydraulic pump, and pump capacity is controlled in such a manner that a tilt angle is controlled by a tilt angle control device (regulator).

The traveling motor 17 is a hydraulic motor for causing the crane 1 to travel, and is driven by pressure oil supplied from the hydraulic pump 12 in which a flow is controlled by the traveling motor control valve 14. The derricking motor 18 is a hydraulic motor for driving the derricking drum 107, and is driven by the pressure oil supplied from the hydraulic pump 12 in which a flow is controlled by the derricking motor control valve 15. The hoisting motor 19 is a hydraulic motor for driving the hoisting drum 105, and is driven by the pressure oil supplied from the hydraulic pump 12 in which a flow is controlled by the hoisting motor control valve 16.

The traveling motor control valve 14 (hereinafter, abbreviated as the control valve 14) is controlled in accordance with a manipulating direction and a manipulating amount of a traveling motor manipulating lever 21 (hereinafter, abbreviated as a manipulating lever 21) provided inside the cab 109. The derricking motor control valve 15 (hereinafter, abbreviated as the control valve 15) is controlled in accordance with a manipulating direction and a manipulating amount of a derricking motor manipulating lever 22 (hereinafter, abbreviated as a manipulating lever 22) provided inside the cab 109. The hoisting motor control valve 16 (hereinafter, abbreviated as the control valve 16) is controlled in accordance with a manipulating direction and a manipulating amount of a hoisting motor manipulating lever 23 (hereinafter, abbreviated as a manipulating lever 23) provided inside the cab 109.

That is, the control valve 14 is controlled by pilot pressure oil from a pilot pump (not illustrated) supplied via a pilot valve 21a manipulated in accordance with the manipulating direction and the manipulating amount of the manipulating lever 21. The control valve 15 is controlled by pilot pressure oil from a pilot pump (not illustrated) supplied via a pilot valve 22a manipulated in accordance with the manipulating direction and the manipulating amount of the manipulating lever 22. The control valve 16 is controlled by pilot pressure oil from a pilot pump (not illustrated) supplied via a pilot valve 23a manipulated in accordance with the manipulating direction and the manipulating amount of the manipulating lever 23.

Drain pipes L1, L2, L3, and L4 which are flow paths of drain hydraulic oil are connected to respective drain ports (not illustrated) of the hydraulic pump 12, the traveling motor 17, the derricking motor 18, and the hoisting motor 19. The drain pipes L1 to L4 are connected to a drain merging pipe L5, and the drain merging pipe L5 is connected to the hydraulic oil tank 13. Therefore, the drain hydraulic oil discharged from the hydraulic pump 12 flows through the drain pipe L1, merges in the drain merging pipe L5, and thereafter, flows into the hydraulic oil tank 13 as merging drain hydraulic oil. The drain hydraulic oil discharged from each of the traveling motor 17, the derricking motor 18, and the hoisting motor 19 flows through each of the drain pipes L2 to L4, and similarly returns to the hydraulic oil tank 13 via the drain merging pipe L5.

Among lines connecting respective devices in FIG. 2, a solid line indicates a main hydraulic pipe, a chain line indicates a pilot hydraulic pipe, and a dashed line indicates a drain (hydraulic oil) pipe.

Pilot hydraulic pipes L11 to L13 connecting the respective pilot valves 21a to 23a of the respective manipulating levers 21 to 23 and the respective control valves 14 to 16 to each other are provided with respective manipulating lever pressure sensors 24 to 26. The manipulating lever pressure sensors 24 to 26 are means for detecting a manipulating state of the respective manipulating levers 21 to 23. That is, the manipulating lever pressure sensor 24 detects a pressure of pilot pressure oil supplied to the control valve 14, the manipulating lever pressure sensor 25 detects a pressure of pilot pressure oil supplied to the control valve 15, and the manipulating lever pressure sensor 26 detects a pressure of pilot pressure oil supplied to the control valve 16.

In addition, a plurality of hydraulic oil pressure sensors for detecting a pressure of pressure oil (hydraulic oil) is provided between the control valve 14 and the traveling motor 17, between the control valve 15 and the derricking motor 18, and between the control valve 16 and the hoisting motor 19.

The hydraulic oil pressure sensors 47a and 47b detect the pressure of the pressure oil supplied to the traveling motor 17. The hydraulic oil pressure sensors 48a and 48b detect the pressure of the pressure oil supplied to the derricking motor 18. The hydraulic oil pressure sensors 49a and 49b detect the pressure of the pressure oil supplied to the hoisting motor 19. The traveling motor 17 rotates in forward and rearward directions. Accordingly, the hydraulic oil pressure sensor 47a is provided in one pipe of the two pipes connected to two respective ports through which the pressure oil flows into and flows out from the traveling motor 17, and the hydraulic oil pressure sensor 47b is provided in the other pipe. The derricking motor 18 and the hoisting motor 19 also rotate in the forward and rearward directions. Accordingly, the hydraulic oil pressure sensors 48a and 49a are provided in one pipe, and the hydraulic oil pressure sensors 48b and 49b are provided in the other pipe, respectively.

Drain flow rate sensors 12v, 17v, 18v, and 19v for detecting the flow rate of the drain hydraulic oil flowing in the respective drain pipes L1, L2, L3, and L4 and drain temperature sensors 12t, 17t, 18t, and 19t for detecting the temperature of the drain hydraulic oil are attached to the respective drain pipes L1, L2, L3, and L4 extending from the hydraulic pump 12, the traveling motor 17, the derricking motor 18, and the hoisting motor 19. The flow rate means a volume or mass of the hydraulic oil flowing per unit time, and is represented by 1/min, for example.

Any two of the drain flow rate sensors 12v, 17v, 18v, and 19v correspond to a "first flow rate detector" and a "second flow rate detector" of the present invention, and any two of the drain temperature sensors 12t, 17t, 18t, and 19t correspond to a "first temperature detector" and a "second temperature detector" of the present invention.

In addition, the hydraulic pump 12, the traveling motor 17, the derricking motor 18, and the hoisting motor 19 each have rotation speed sensors 12r, 17r, 18r, and 19r for detecting their own rotation speed, and internal pressure sensors 12p, 17p, 18p, and 19p for detecting their own internal pressure.

In addition to the above-described sensors, there are provided a pump discharge pressure sensor 42 for detecting a discharge pressure of the hydraulic pump 12, a hydraulic oil tank temperature sensor (merging temperature detector) 43 for detecting the temperature of the hydraulic oil tank 13, an engine rotation speed sensor 51 for detecting a rotation speed of the engine 11, and a tilt angle sensor 52 for detecting a pump tilt angle of the hydraulic pump 12.

Figure 3A:
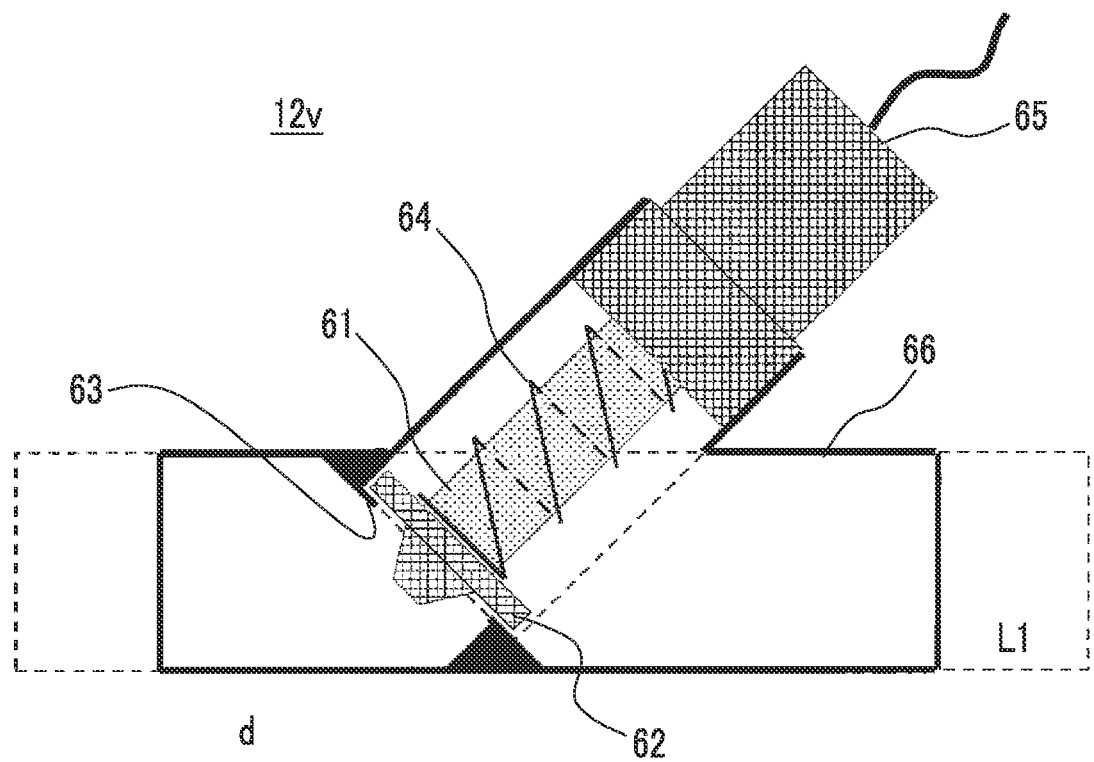
FIG. 3A is a view illustrating a structure and an operation principle of a drain flow rate sensor, and is a view illustrating a state where drain hydraulic oil does not flow in a drain pipe.
Figure 3B:
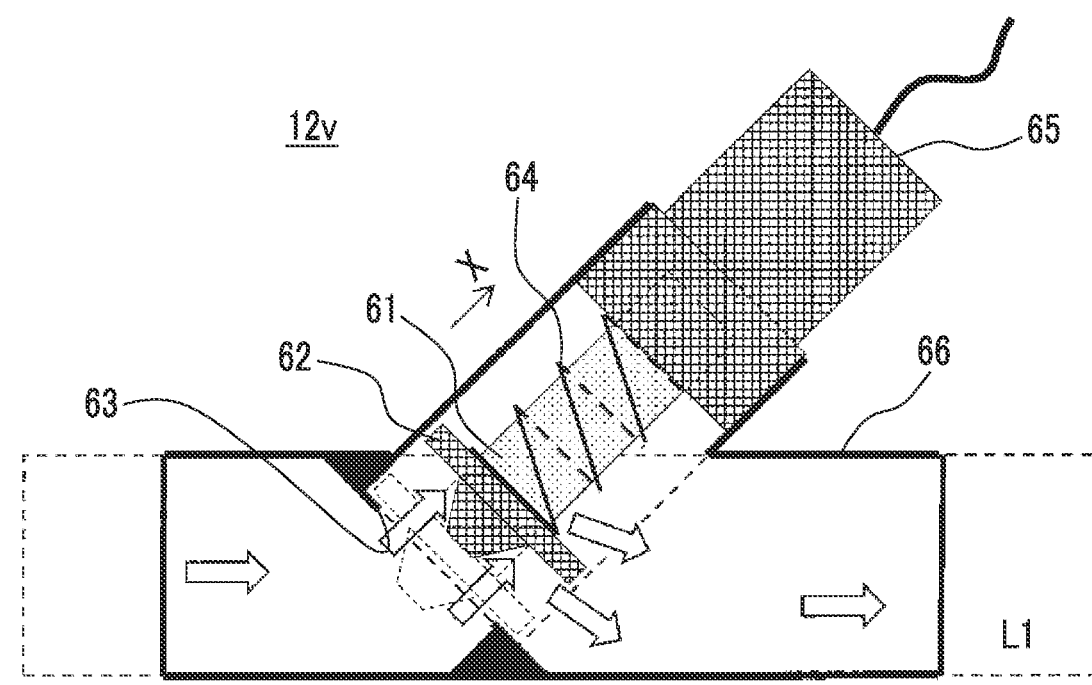
FIG. 3B is a view illustrating the structure and the operation principle of the drain flow rate sensor, and is a view illustrating a state where the drain hydraulic oil flows in the drain pipe.

The present embodiment has a characteristic structure of the drain flow rate sensors 12v, 17v, 18v, and 19v. Accordingly, the structure will be described in detail with reference to FIGS. 3A and 3B. FIGS. 3A and 3B are views illustrating the structure and an operation principle of the drain flow rate sensor used in the present embodiment. FIG. 3A is a view illustrating a state where drain hydraulic oil does not flow in the drain pipe, and FIG. 3B is a view illustrating a state where the drain hydraulic oil flows in the drain pipe. All of the drain flow rate sensors 12v, 17v, 18v, and 19v used in the present embodiment have the same structure. Accordingly, the drain flow rate sensor 12v will be described as an example.

As illustrated in FIG. 3A, the drain flow rate sensor 12v includes a unit structure in which a columnar stem (moving body) 61, an umbrella-shaped valve body (moving body) 62 provided in a tip of the stem 61, a valve seat 63, a spring 64 that biases the valve body 62 in a direction of pressing the valve seat 63 (direction of blocking a flow of the drain hydraulic oil), and an output unit 65 that externally outputs a signal based on a movement amount of the valve body 62 are integrally accommodated inside a casing 66, and is connected to the drain pipe L1 by means of screwing.

In a state where the drain hydraulic oil does not flow in the drain pipe L1, as illustrated in FIG. 3A, the valve body 62 is pressed by the spring 64, thereby closing the valve seat 63. When the drain hydraulic oil discharged from the hydraulic pump 12 flows in the drain pipe L1, as illustrated in FIG. 3B, the drain hydraulic oil causes the valve body 62 to move in an illustrated X-direction along an axial direction of the stem 61 against a biasing force of the spring 64, thereby forming a gap between the valve seat 63 and the valve body 62. The drain hydraulic oil flows in a direction of an illustrated white arrow after passing through the gap. The movement amount of the valve body 62 at this time is converted into the flow rate, and is output from the output unit 65 to a controller 31 (to be described later) as a flow rate detection signal. Specifically, a voltage (current) having a magnitude corresponding to the movement amount of the valve body 62 is output to the controller 31. The controller 31 of the crane 1 has many methods of receiving an external signal by using the voltage (current). Accordingly, it is not necessary to change an interface of the controller 31 by adopting a voltage (current) type output.

FIG. 4 is a view illustrating a detailed configuration of the drain flow rate sensor 12v and the drain temperature sensor 12t. As illustrated in FIG. 4, the drain temperature sensor 12t mainly includes a probe 71 protruding into the drain pipe L1, and an output unit 72 that externally outputs a signal indicating the temperature of the drain hydraulic oil detected by the probe 71. The probe 71 and the output unit 72 are accommodated and unitized in the casing 73. The drain temperature sensor 12t measures the temperature by bringing the probe 71 into contact with the drain hydraulic oil, and outputs a signal indicating the measured temperature to the controller 31 through the output unit 72.

The drain flow rate sensor 12v and the drain temperature sensor 12t are disposed in series on the drain pipe L1. More specifically, the drain temperature sensor 12t is disposed on a downstream side in a flow of the drain hydraulic oil flowing in the drain pipe L1 from the drain flow rate sensor 12v.

A configuration illustrated in FIG. 4 is partially or entirely applicable to the drain flow rate sensors 12v, 17v, 18v, and 19v and the drain temperature sensors 12t, 17t, 18t, and 19t. In addition, in a case where a configuration illustrated in FIG. 5 is only partially applied, it is desirable that the configuration is applied to, for example, a sensor connected to a hydraulic actuator having large vibrations.

When the drain hydraulic oil flowing in the drain pipe L1 comes into contact with the probe 71, the flow of the drain hydraulic oil is disturbed. Therefore, the drain flow rate sensor 12v and the drain temperature sensor 12t are disposed as illustrated in FIG. 4. In this manner, the flow rate of the drain hydraulic oil can be measured before the flow of the drain hydraulic oil is disturbed by the probe 71.

The temperature of the drain hydraulic oil varies in a process where the drain hydraulic oil passes through the drain pipe L1. Therefore, from a viewpoint of properly measuring the flow rate and the temperature of the drain hydraulic oil, it is desirable that the drain flow rate sensor 12v and the drain temperature sensor 12t are disposed close to each other on the drain pipe L1.

In addition, the casing 73 of the drain temperature sensor 12t may be integrated with the casing 66 of the drain flow rate sensor 12v, or may be connected to the casing 66 of the drain flow rate sensor 12v via an adapter (not illustrated). Alternatively, the drain temperature sensor 12t may be incorporated in the drain flow rate sensor 12v.

FIG. 5 is a view illustrating a configuration of a flow path of the drain hydraulic oil from the hydraulic motors 17, 18 and 19 to the hydraulic oil tank 13. The drain pipe L2 is configured to include a flexible hose (pipe) 17s, the drain flow rate sensor 17v, and the drain temperature sensor 17t. More specifically, for example, one end of the hose 17s is connected to a drain port of the traveling motor 17 via a screw-type pipe joint (not illustrated), and the other end is connected to the drain flow rate sensor 17v via a screw-type pipe joint (not illustrated). That is, the drain flow rate sensor 17v is connected to the traveling motor 17 via the flexible hose 17s.

In addition, the drain flow rate sensor 17v and the drain temperature sensor 17t are disposed in a portion extending in a longitudinal direction of the drain pipe L2. In other words, a flowing direction of the drain hydraulic oil inside the casings 66 and 73 is the longitudinal direction. Furthermore, the drain flow rate sensor 17v and the drain temperature sensor 17t are disposed to be aligned in the longitudinal direction. The term "longitudinal direction" as used herein refers to a direction in which an angle formed by a vertical direction is smaller than 45° and is preferably smaller than 30°.

In addition, the merging pipe L5 is supported by the rotating platform 102 which is an example of the construction machine main body, and extends substantially in a horizontal direction. In addition, the merging pipe L5 has adapters 17a, 18a, and 19a to which the drain pipes L2, L3, and L4 are connected. That is, the merging pipe L5 functions as a drain merging section in which the drain pipes L2, L3, and L4 merge with each other.

Furthermore, the casing 66 of the drain flow rate sensor 17v, the casing 73 of the drain temperature sensor 17t, the adapter 17a, and the merging pipe L5 are formed of a material having higher rigidity than that of the hose 17s. The drain temperature sensor 17t is connected to the adapter 17a of the merging pipe L5. That is, the drain flow rate sensor 17v and the drain temperature sensor 17t are supported by the adapter 17a of the merging pipe L5. In other words, each weight of the drain flow rate sensor 17v and the drain temperature sensor 17t is supported by the merging pipe L5.

In addition, the drain pipe L3 is configured to include a flexible hose (pipe) 18s, the drain flow rate sensor 18v, and the drain temperature sensor 18t. Furthermore, the drain pipe L4 is configured to include a flexible hose (pipe) 19s, the drain flow rate sensor 19v, and the drain temperature sensor 19t. Disposition of respective components of the drain pipes L3 and L4 is the same as that of the drain pipe L2, and thus, repeated description will be omitted. One of the drain pipes L2, L3, and L4 is a first flow path, and another is a second flow path.

According to the configuration illustrated in FIG. 5, the traveling motor 17 and the sensors 17v and 17t are connected to each other via the flexible hose 17s. Therefore, the vibrations of the traveling motor 17 can be prevented from propagating to the sensors 17v and 17t. In addition, the rigidity of the casings 66 and 73, the adapter 17a, and the merging pipe L5 is higher than that of the hose 17s. In this manner, it is possible to prevent a shortened life or erroneous measurement of the sensors 17v and 17t.

In addition, according to the configuration illustrated in FIG. 5, the weight of the sensors 17v and 17t is not loaded on the hose 17s. As a result, it is possible to prevent the pipe L2 in a cantilever beam state from being damaged from a joint portion (screw-type pipe joint) between the hose 17s and the traveling motor 17 due to the weight of the sensors 17v and 17t and the vibrations of the traveling motor 17.

In addition, according to the configuration illustrated in FIG. 5, the flow path inside the drain flow rate sensor 17v and the drain temperature sensor 17t is formed in the longitudinal direction. Therefore, it is possible to prevent the drain flow rate sensor 17v and the drain temperature sensor 17t from being vibrated as in a cantilever beam due to the vibrations of the hydraulic motor 17.

The configuration illustrated in FIG. 5 is partially or entirely applicable to the drain flow rate sensors 12v, 17v, 18v, and 19v and the drain temperature sensors 12t, 17t, 18t, and 19t. In addition, in a case where a configuration illustrated in FIG. 5 is only partially applied, it is desirable that the configuration is applied to a sensor connected to a hydraulic actuator having large vibrations, for example.

Figure 6:
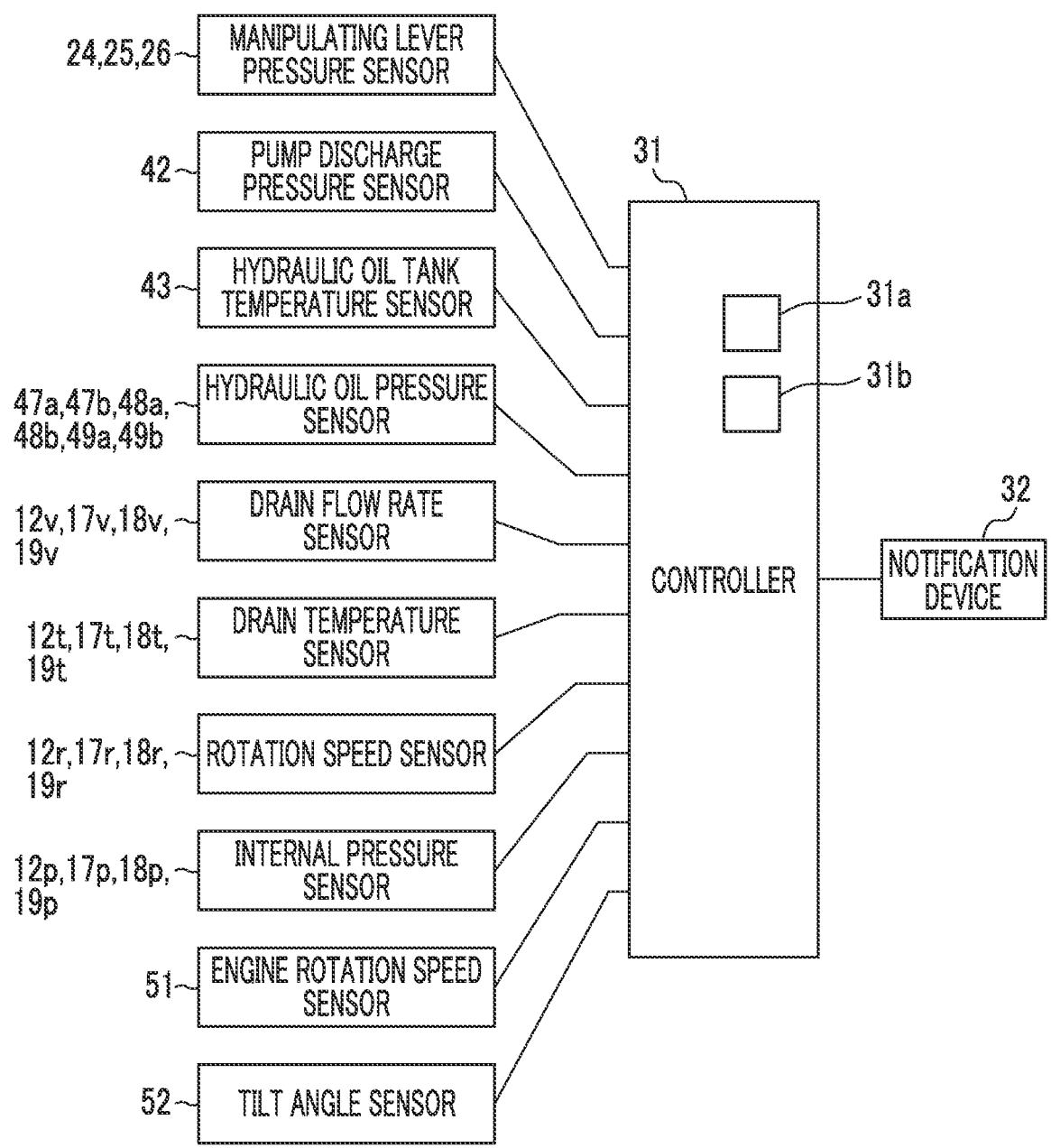
FIG. 6 is a block diagram illustrating an input and an output of a controller.

FIG. 6 is a block diagram illustrating an input and an output of the controller 31. The controller 31 is a computer that controls each unit of the crane 1, and has a CPU 31a, a storage unit 31b, and other peripheral devices as illustrated in FIG. 6.

In the controller 31, the manipulating lever pressure sensors 24 to 26, the pump discharge pressure sensor 42, the hydraulic oil tank temperature sensor 43, the hydraulic oil pressure sensors 47a, 47b, 48a, 48b, 49a, and 49b, the drain flow rate sensors 12v, 17v, 18v, and 19v, the drain temperature sensors 12t, 17t, 18t, and 19t, the rotation speed sensors 12r, 17r, 18r, and 19r, the internal pressure sensors 12p, 17p, 18p, and 19p, the engine rotation speed sensor 51, and the tilt angle sensor 52 are connected to an input side of the controller 31. In addition, a notification device 32 is connected to an output side of the controller 31.

The controller 31 inputs detection signals from various sensors, determines whether or not the hydraulic pump 12, the traveling motor 17, the derricking motor 18, and the hoisting motor 19 are abnormal by performing a process (to be described later), and outputs an abnormality signal to the notification device 32 in a case of the abnormality.

The notification device 32 is a device for notifying an operator whether or not the hydraulic system including the hydraulic pump 12, the traveling motor 17, the derricking motor 18, and the hoisting motor 19 is abnormal, and includes a display monitor and a speaker, for example. The notification device 32 is provided inside the cab 109.

Figure 7:
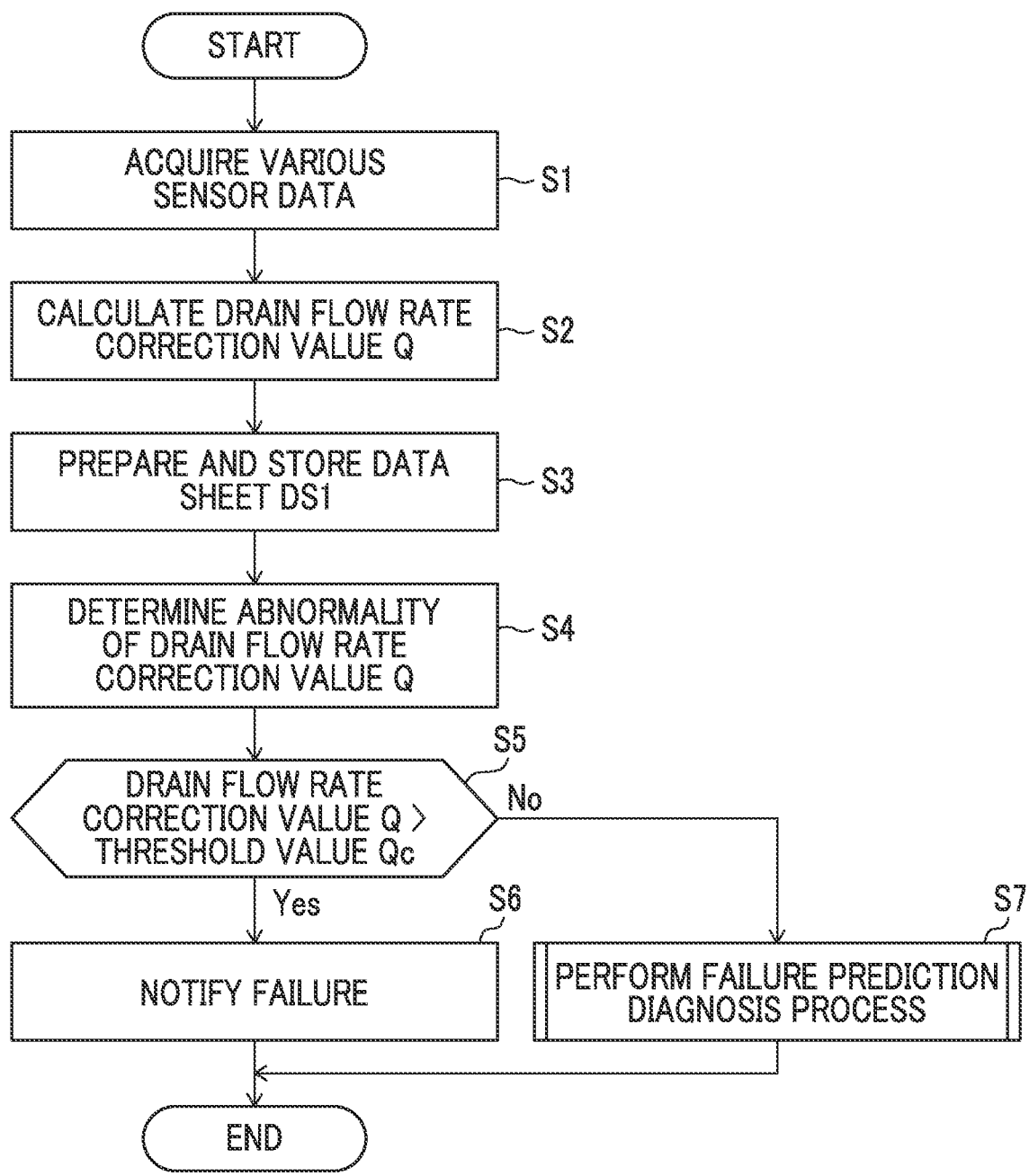
FIG. 7 is a flowchart illustrating a procedure of an abnormality determination process of a hydraulic system.

Next, an abnormality determination process of the hydraulic system which is performed by the controller 31 will be described. FIG. 7 is a flowchart illustrating a procedure of the abnormality determination process of the hydraulic system. The process illustrated in FIG. 7 starts when a key switch (not illustrated) of the engine 11 is turned on, and is repeatedly performed at a predetermined interval (for example, every second).

As illustrated in FIG. 7, the controller 31 acquires data from various sensors (Step S1). Specifically, the controller 31 acquires drain flow rate data Vd from the drain flow rate sensors 12v and 17v to 19v, drain temperature data Td from the drain temperature sensors 12t and 17t to 19t, rotation speed data Ra from the rotation speed sensors 12r and 17r to 19r, and internal pressure data Pi from the internal pressure sensors 12p and 17p to 19p.

Next, the controller 31 refers to a correction value table 70 to calculate a drain flow rate after temperature correction, that is, a drain flow rate correction value Q, based on the acquired drain flow rate data Vd and the acquired drain temperature data Td (Step S2).

FIG. 8 is a configuration diagram of the correction value table 70. As illustrated in FIG. 8, in the correction value table 70, the drain flow rate correction value Q for the drain flow rate data Vd and the drain temperature data Td is defined. Specifically, for the drain flow rate data Vd=V1, the drain flow rate correction value Q=Q11 in a case where the drain temperature data Td is T1, and the drain flow rate correction value Q=Q12 in a case of Td=T2, and in such a manner, the drain flow rate data Vd, the drain temperature data Td, and the drain flow rate correction value Q are associated with each other in advance in the correction value table 70. Therefore, when the drain flow rate data Vd is acquired from the drain flow rate sensors 12v and 17v to 19v and the drain temperature data Td is acquired from the drain temperature sensors 12t and 17t to 19t, the controller 31 can refer to the correction value table 70 to uniquely calculate the drain flow rate correction value Q.

In a case where the drain temperature data Td input to the controller 31 is a temperature which is not specified in the correction value table 70, for example, in a case where the drain temperature data Td is T4 to T5 which is a value between T4 and T5 and the drain flow rate data Vd is V2 to V3 which is a value between V2 and V3, the controller 31 may calculate the drain flow rate correction value Q in accordance with Equation 1 below.

$$Q = \frac{T_5 - T_{4\sim5}}{T_5 - T_4} \times \left[ \frac{Q_{34} - Q_{24}}{V_3 - V_2} \times (V_{2\sim3} - V_2) + Q_{24} \right] + \frac{T_{4\sim5} - T_4}{T_5 - T_4} \times \left[ \frac{Q_{35} - Q_{25}}{V_3 - V_2} \times (V_{2\sim3} - V_2) + Q_{25} \right]$$

Equation 1

Any method for calculating the drain flow rate correction value Q may be adopted as long as the method is adopted based on the drain flow rate data Vd. As another example, the controller 31 may specify viscosity corresponding to the drain flow rate data Vd, based on a viscosity table that defines a correspondence relationship between the drain flow rate and the viscosity of the hydraulic oil. The controller 31 may specify the drain flow rate correction value Q corresponding to the viscosity of the hydraulic oil, based on a correction value table that defines a correspondence relationship between the viscosity and the drain flow rate correction value Q.

For example, the viscosity table and the correction value table which are described above are stored in the storage unit 31b. In addition, the storage unit 31b may store a plurality of the viscosity tables corresponding to types of the hydraulic oil. The controller 31 may specify the drain flow rate correction value Q by using the viscosity table corresponding to a type of the hydraulic oil which is designated by an operator.

Next, the controller 31 prepares a data sheet DS1 by using various sensor data acquired in Step S1 and the drain flow rate correction value Q calculated in Step S2, and stores the data sheet DS1 in the storage unit 31b.

FIG. 9 is a configuration diagram of the data sheet DS1 prepared in the present embodiment. As illustrated in FIG. 9, the data sheet DS1 has blank spaces for writing data of the drain temperature sensor, the drain flow rate correction value, the rotation speed sensor, and the internal pressure sensor for each target device (the hydraulic pump 12 and the traveling motor 17). The controller 31 prepares the data sheet DS1 by writing data (for example, Td11 and Qp11) in the blank spaces for each process time (times t1, t2, and so forth). In the data sheet DS1, an allowable value (to be described later) for the drain flow rate correction value is set in advance.

Referring back to FIG. 7, the controller 31 determines the abnormality of the drain flow rate correction value Q by comparing the drain flow rate correction value Q and a threshold value Qc with each other (Step S4). Here, the threshold value Qc is determined in advance for each target device in accordance with specifications of the hydraulic pump 12, the traveling motor 17, the derricking motor 18, and the hoisting motor 19. For example, 110% of a design value of a drain discharge amount of the hoisting motor 19 is set as the threshold value Qc for the hoisting motor 19. In a case where the drain flow rate correction value Q exceeds the threshold value Qc (Step S5/Yes), the controller 31 outputs the abnormality signal to the notification device 32, and for example, the notification device 32 displays the failure on a monitor (Step S6).

Figure 10:
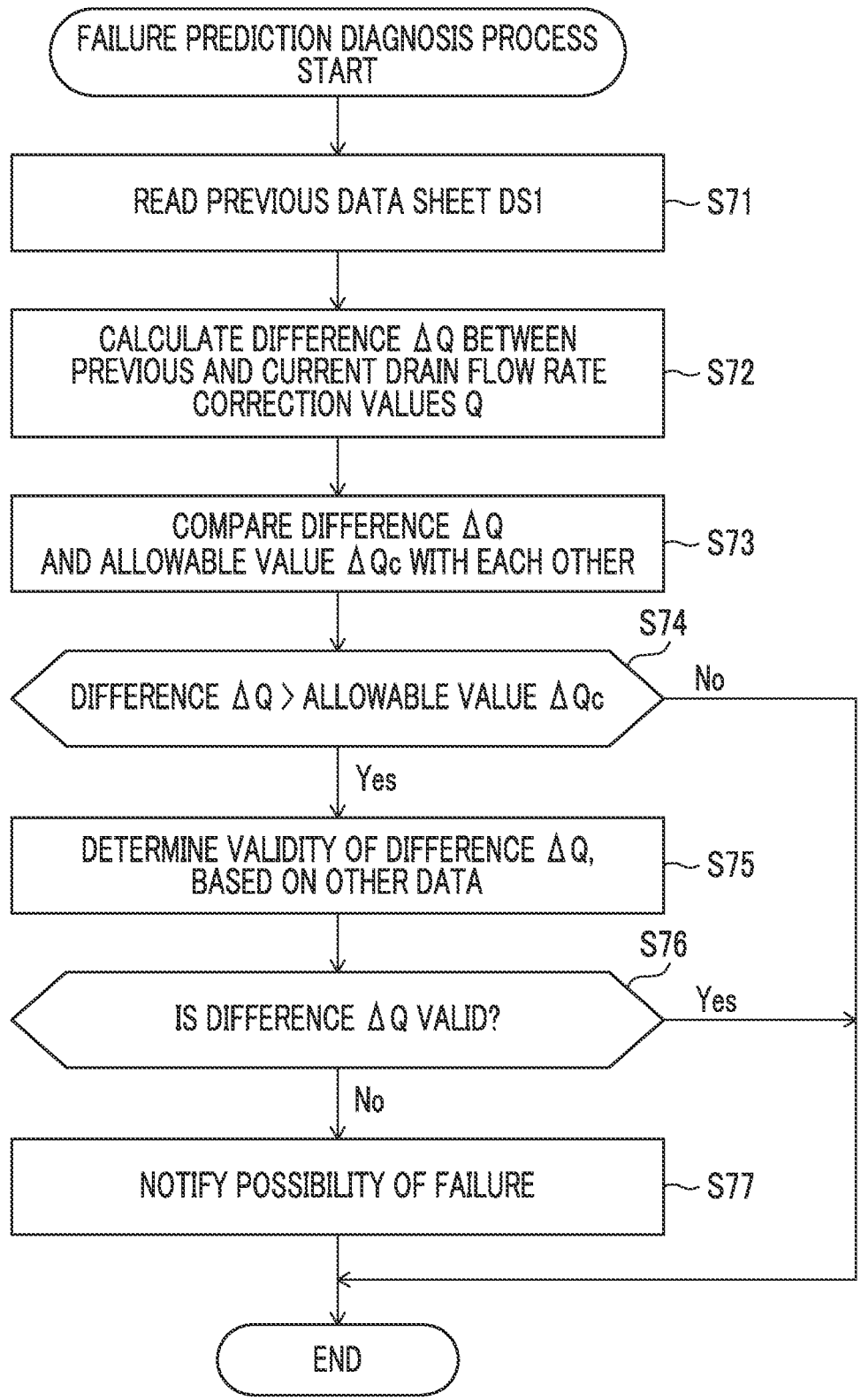
FIG. 10 is a flowchart illustrating a procedure of a failure prediction diagnosis process.

On the other hand, in a case where the drain flow rate correction value Q is equal to or smaller than the threshold value Qc (Step S5/No), the controller 31 performs a failure prediction diagnosis process (Step S7). FIG. 10 is a flowchart illustrating a procedure of the failure prediction diagnosis process. As illustrated in FIG. 10, when the failure prediction diagnosis process starts, the controller 31 reads the previously prepared data sheet DS1 from the storage unit 31b (Step S71), calculates a difference ΔQ between the previous and current drain flow rate correction values Q (Step S72), and compares magnitudes of the difference ΔQ and the allowable value ΔQc with each other (Step S73).

The allowable value ΔQc may be a fixed value or a variable value as long as the value can be compared with the difference ΔQ. As an example, the allowable value ΔQc may be a fixed value determined by an experiment or a simulation performed in advance. That is, in Step S73, the controller 31 may read the allowable value ΔQc stored in advance in the storage unit 31b, and may compare the allowable value ΔQc with the difference ΔQ.

As another example, the controller 31 may determine the allowable value ΔQc, based on at least one of the internal pressure detected by the internal pressure sensors 17p, 18p, and 19p, the rotation speed detected by the rotation speed sensors 17r, 18r, and 19r, the tilt angle of the hydraulic pump 12, and the temperature (in other words, the viscosity of the hydraulic oil) of the hydraulic oil which is detected by the temperature sensors 12t, 17t, 18t, 19t, and 43.

More specifically, in the controller 31, as the internal pressure is higher, the allowable value ΔQc may be increased. As the rotation speed is higher, the allowable value ΔQc may be increased. As the tilt angle is smaller, the allowable value ΔQc may be increased. In this manner, as the temperature is higher (that is, as the viscosity is lower), the allowable value ΔQc may be increased.

A relationship between a parameter (the internal pressure, the rotation speed, the tilt angle, or the temperature) and the allowable value ΔQc is stored in the storage unit 31b in a form of a table or a function. The controller 31 may use the table or the function to specify the allowable value ΔQc corresponding to the current parameter (the internal pressure, the rotation speed, the tilt angle, or the temperature), and may compare the specified allowable value ΔQc and the difference ΔQ with each other.

In a case where the difference ΔQ exceeds the allowable value ΔQc (Step S74/Yes), the controller 31 determines validity of the difference ΔQ, based on the rotation speed data Ra from the rotation speed sensors 12r and 17r to 19r and the internal pressure data Pi from the internal pressure sensors 12p and 17p to 19p which are other data (Step S75). The specific determination will be described later.

In a case where it is determined that the difference ΔQ is not valid (Step S76/No), the controller 31 outputs a signal indicating a high probability that the device may fail in the near future, to the notification device 32, and the notification device 32 displays failure prediction (Step S77). On the other hand, in a case where the difference ΔQ is equal to or smaller than the allowable value ΔQc (Step S74/No) and in a case where it is determined that the difference ΔQ is valid (Step S76/Yes), the probability that the device may fail is low. Therefore, the failure prediction diagnosis process is completed.

The above-described series of processes will be described by exemplifying a case where the abnormality is determined for the hoisting motor 19. In this case, the controller 31 acquires each sensor data from the drain flow rate sensor 19v, the drain temperature sensor 19t, the rotation speed sensor 19r, and the internal pressure sensor 19p (Step S1), and refers to the correction value table 70 to calculate a drain flow rate correction value Qw (Step S2).

Next, the controller 31 writes a calculated drain flow rate correction value Qw42 in the blank space of the drain flow rate correction value Qw at time t2 (current process time) of the data sheet DS1, and also writes a drain temperature Td42 from the drain temperature sensor 19t, a rotation speed Ra42 from the rotation speed sensor 19r, and an internal pressure Pi42 from the internal pressure sensor 19p in the corresponding blank space of the data sheet DS1. When each data at time t2 is written in the data sheet DS1, the controller 31 stores the data sheet DS1 in the storage unit 31b (Step S3). Next, the controller 31 determines whether or not the drain flow rate correction value Qw42 exceeds a predetermined threshold value Qcw (Step S4). In a case where the drain flow rate correction value Qw42 exceeds the predetermined threshold value Qcw (Step S5/Yes), the controller 31 notifies the notification device 32 that the hoisting motor 19 is in failure (Step S6).

On the other hand, in a case where the drain flow rate correction value Qw42 is equal to or smaller than the threshold value Qcw (Step S5/No), the drain flow rate correction value Qw42 of the hoisting motor 19 falls within a normal range. Therefore, a user is not notified of the failure. However, it is determined whether or not there is a possibility of the failure in the near future (Step S7). Specifically, the controller 31 reads the drain flow rate correction value Qw41 stored in the data sheet DS1 at time t1 which is the previous process time (Step S71), and obtains a difference ΔQw between the drain flow rate correction value Qw41 at previous time t1 and the drain flow rate correction value Qw42 calculated at current time t2 (Step S72). Next, the controller 31 compares whether or not the difference ΔQw exceeds an allowable value ΔQcw (Step S73). In a case where the difference ΔQw exceeds the allowable value ΔQcw (Step S74/Yes), the controller 31 determines validity of the difference ΔQw (Step S75). In a case where the difference ΔQw is equal to or smaller than the allowable value ΔQcw (Step S74/No), the controller 31 completes the failure prediction diagnosis process.

In Step S75, in view of a change between the drain temperature Td41, the rotation speed Ra41, and the internal pressure Pi41 at time t1 (previous time) and the drain temperature Td42, the rotation speed Ra42, and the internal pressure Pi42 at time t2 (current time), the controller 31 determines whether or not the difference ΔQw is valid. For example, when a work load of the crane 1 is suddenly changed, it is assumed that the temperature of the drain hydraulic oil discharged from the hoisting motor 19, and the rotation speed and the internal pressure of the hoisting motor 19 are suddenly changed. In this case, even when the difference ΔQw exceeds the allowable value ΔQcw, a probability that the hoisting motor 19 may fail is low. In this case, the controller 31 determines that the difference ΔQ is valid (Step S76/Yes), and completes the failure prediction diagnosis process.

On the other hand, in a case where it is determined that the difference ΔQ is not valid (Step S76/No), the controller 31 notifies an operator via the notification device 32 of a high probability that the hoisting motor 19 may fail in the near future (Step S77). Both the abnormality determination in Steps S4 and S5 and the failure prediction diagnosis in Step S7 correspond to the process of determining the abnormality of the hydraulic actuator. However, only one of the two processes may be performed.

As described above, according to the present embodiment, the drain flow rate sensors 12v, 17v, 18v, and 19v and the drain temperature sensors 12t, 17t, 18t, and 19t are provided in the respective drain pipes L1, L2, L3, and L4. Therefore, not only when the crane 1 is independently manipulated, but also when the crane 1 is manipulated in combination, it is possible to determine which one of the hydraulic pump 12, the traveling motor 17, the derricking motor 18, and the hoisting motor 19 is abnormal.

In addition, the drain flow rate sensors 12v, 17v, 18v, and 19v have a simple configuration in which the valve body 62 moves to be perpendicular to the valve seat 63 as illustrated in FIGS. 3A and 3B. Therefore, the drain flow rate sensors 12v, 17v, 18v, and 19v can be inexpensively downsized. In addition, the drain flow rate sensors 12v, 17v, 18v, and 19v do not have a rotating body due to the structure. Therefore, even when a small amount of a solid matter is contained in the drain hydraulic oil, accuracy in detecting the flow rate is not significantly affected, and a strainer does not need to be provided in the drain pipes L1 to L4. Therefore, pipes can be more freely designed. In addition, daily maintenance is not particularly required. Accordingly, reduced maintenance costs can be expected.

Here, as a type of the flow rate sensor, in addition to a type adopted in the present embodiment, for example, a gear type and an impeller type may be used. However, these are expensive, and in order to prevent failure caused by contamination, a strainer needs to be provided on the upstream side of the flow rate sensor. For these reasons, it is practically difficult to apply the types to the present invention. In this regard, the drain flow rate sensors 12v, 17v, 18v, and 19v adopted in the present embodiment are advantageously used, since the drain flow rate sensors have a simple structure, have few failures, and are inexpensive, compared to the gear type and the impeller type.

In addition, the viscosity of the drain hydraulic oil greatly fluctuates depending on the temperature. However, in the present embodiment, temperature correction is performed on the drain flow rate detected by the drain flow rate sensors 12v, 17v, 18v, and 19v. Therefore, it is possible to accurately detect the flow rate of the drain hydraulic oil, and it is possible to determine with high accuracy the abnormality of the hydraulic pump 12, the traveling motor 17, the derricking motor 18, and the hoisting motor 19. Moreover, the correction is performed by using the correction value table 70. Therefore, it is easy to calculate the drain flow rate correction value.

In addition, a configuration is adopted so that the data sheet DS1 is prepared, and the previous and current drain flow rate correction values are compared with each other to predict the failure. Therefore, a possibility of the abnormality of the hydraulic pump 12, the traveling motor 17, the derricking motor 18, and the hoisting motor 19 can be determined in advance. Maintenance measures are taken at an early stage. In this manner, a life of the hydraulic pump 12, the traveling motor 17, the derricking motor 18, and the hoisting motor 19 can be extended.

Modification Example 1

In the above-described embodiment, in Step S1, the controller 31 acquires the drain temperature data Td from the drain temperature sensors 12t and 17t to 19t. However, alternatively, the controller 31 may acquire hydraulic oil tank temperature data from the hydraulic oil tank temperature sensor 43, and may calculate the drain flow rate correction value Q for each device, based on the hydraulic oil tank temperature data. The drain hydraulic oil from the hydraulic pump 12, the traveling motor 17, the derricking motor 18, and the hoisting motor 19 flows into the hydraulic oil tank 13. Therefore, the hydraulic oil temperature inside the hydraulic oil tank is detected by using the hydraulic oil tank temperature Ts. In this manner, it is possible to indirectly detect the temperature of the drain hydraulic oil of each device. In this case, the controller may write the hydraulic oil tank temperature Ts in a data sheet DS2 (refer to FIG. 11) for each time. In this modification example, a small amount of data is written and stored in the data sheet DS2. Therefore, memory capacity of the storage unit 31b can be reduced.

Modification Example 2

In addition, a configuration of the data sheet DS1 is not limited to the example illustrated in FIG. 9. For example, blank spaces for writing the data of the drain temperature sensor, the drain flow rate correction value, the rotation speed sensor, and the internal pressure sensor may be partially omitted. Furthermore, in addition to the above-described blank spaces for writing the data, a blank space for writing the data of the hydraulic oil pressure sensor may be further provided.

Modification Example 3

In addition, in the above-described embodiment, an example of determining the abnormality in a case where the drain flow rate correction value Q exceeds the threshold value Qc has been described. However, a criterion for determining whether or not there is the abnormality is not limited thereto. As another example, 90% of a design value of a drain discharge amount may be set to the threshold value Qc, and the abnormality may be determined in a case where the drain flow rate correction value Q falls below the threshold value Qc.

Modification Example 4

Figure 12:
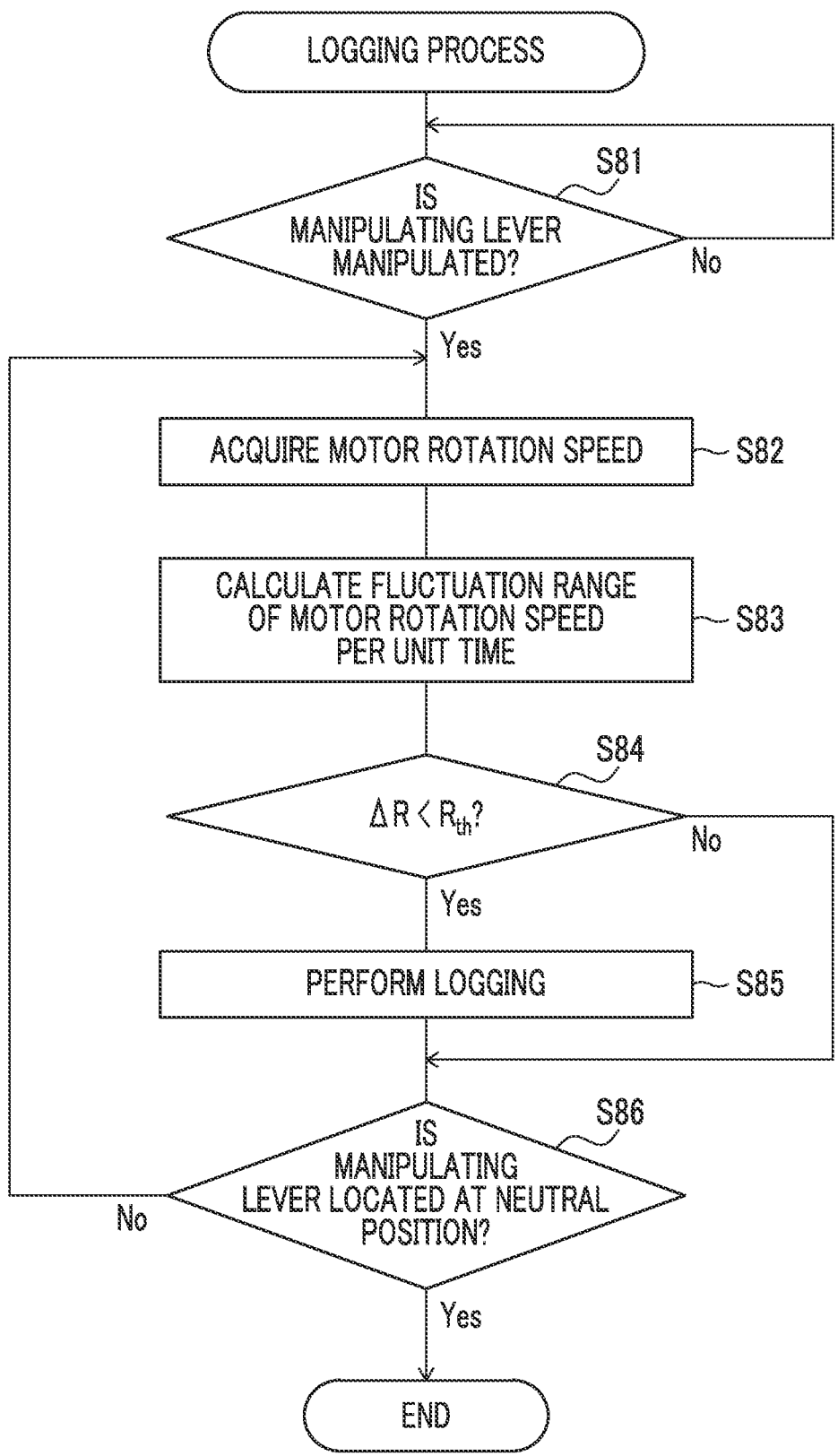
FIG. 12 is a flowchart of a logging process.
Figure 13:
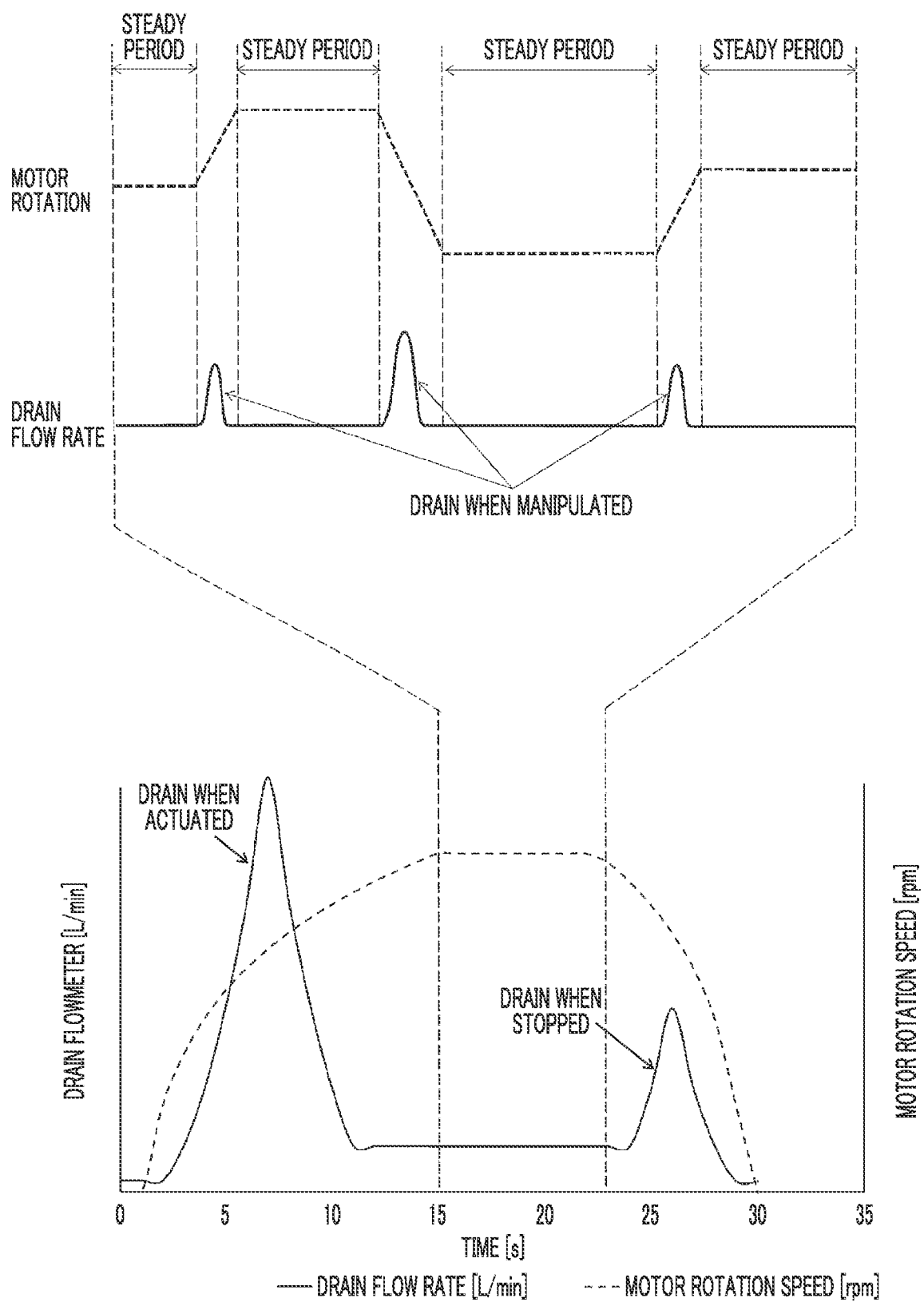
FIG. 13 is a view illustrating a relationship between a motor rotation speed and a drain flow rate.

Next, Modification Example 4 of the present invention will be described with reference to FIGS. 12 and 13. FIG. 12 is a flowchart of a logging process. FIG. 13 is a view illustrating a relationship between the motor rotation speed and the drain flow rate. Detailed description of points common to those of the above-described embodiment will be omitted, and different points will mainly be described.

For example, the controller 31 according to Modification Example 4 monitors manipulation of the manipulating lever 21 in response to starting of the engine 11 (S81). More specifically, the controller 31 determines whether or not the manipulating lever 21 is manipulated from a neutral position. For example, whether or not the manipulating lever 21 is manipulated may be determined, based on the hydraulic pressure detected by the pressure sensor 24, or may be determined, based on a detection result of a sensor (not illustrated) attached to the manipulating lever 21.

Next, in a case where the controller 31 determines that the manipulating lever 21 is manipulated from the neutral position (S81: Yes), the controller 31 acquires the rotation speed (hereinafter, referred to as a "motor rotation speed") of the traveling motor 17 which is detected by the rotation speed sensor 17r (S82). The controller 31 stores the acquired motor rotation speed in the storage unit 31b.

The processes in Steps S82 to S85 are repeatedly performed. In this manner, a plurality of the motor rotation speeds are stored in the storage unit 31b. For example, the process in Step S82 is repeatedly performed at an interval of 0.1 seconds, and the latest 10 motor rotation speeds are stored in the storage unit 31b. When the process in Step S82 is newly performed, the oldest motor rotation speed is deleted, and the new motor rotation speed is stored.

Next, the controller 31 calculates a fluctuation range $\Delta R$ of the motor rotation speed per unit time, based on the motor rotation speeds stored in the storage unit 31b (S83). More specifically, as the fluctuation range $\Delta R$, the controller 31 calculates a difference between the maximum motor rotation speed and the minimum motor rotation speed out of the latest n-th number of motor rotation speeds (in other words, within the latest predetermined time). For example, when n=10 is satisfied, the unit time (predetermined time) is 1 second.

Next, the controller 31 determines whether or not the fluctuation range $\Delta R$ calculated in Step S83 is smaller than a threshold value $R_{th}$ (S84). The threshold value $R_{th}$ is an upper limit value of the fluctuation range $\Delta R$ by which it can be determined that the rotation of the traveling motor 17 is stable. For example, the threshold value $R_{th}$ is determined by an experiment or a simulation performed in advance, and is stored in the storage unit 31b.

Next, in a case where the controller 31 determines that the fluctuation range $\Delta R$ is smaller than the threshold value $R_{th}$ (S84: Yes), the controller 31 performs logging (S85). More specifically, in Step S85, the controller 31 performs the processes in Steps S1 to S3 in FIG. 7. That is, one data sheet DS1 is added to the storage unit 31b each time Step S85 is performed. On the other hand, when the controller 31 determines that the fluctuation range $\Delta R$ is equal to or greater than the threshold value $R_{th}$ (S84: No), the controller 31 does not perform the process in Step S85, and the process proceeds to Step S86.

Next, the controller 31 determines whether or not the manipulating lever 21 returns to the neutral position (S86). For example, a specific determination method is the same as that in Step S81. In a case where the controller 31 determines that the manipulating lever 21 does not return to the neutral position (that is, the manipulating lever 21 is continuously manipulated) (S86: No), the controller 31 performs the processes subsequent to Step S82 again.

On the other hand, in a case where the controller 31 determines that the manipulating lever 21 returns to the neutral position (that is, the manipulating lever 21 is completely manipulated) (S86: Yes), the controller 31 completes the logging process. That is, the processes in Steps S82 to S85 are repeatedly performed until the manipulating lever 21 returns to the neutral position after the manipulating lever 21 starts to be manipulated.

As illustrated in the lower part of FIG. 13, when the manipulating lever 21 starts to be manipulated at the neutral position, the motor rotation speed gradually increases, and the discharge amount of the drain hydraulic oil discharged from the traveling motor 17 temporarily rises sharply (drain when actuated). In addition, when the manipulating lever 21 returns to the neutral position, the motor rotation speed gradually decreases, and the discharge amount of the drain hydraulic oil discharged from the traveling motor 17 temporarily rises sharply (drain when stopped).

Furthermore, as illustrated in the upper part of FIG. 13, when the manipulating amount of the manipulating lever 21 is changed, the motor rotation speed fluctuates (increases or decreases), and the discharge amount of the drain hydraulic oil temporarily rises sharply (drained when manipulated). On the other hand, while the manipulating amount of the manipulating lever 21 is constant, the fluctuation range of the motor rotation speed and the drain flow rate is small (steady period).

Therefore, in a case where the abnormality is determined based on the data sheet DS1 prepared at timings of the drain when actuated, the drain when stopped, and the drain when manipulated as illustrated in FIG. 13, the case may result in erroneous determination. On the other hand, when the abnormality is determined based on the data sheet DS1 prepared in the steady period, a proper determination result can be expected.

Therefore, the logging process illustrated in FIG. 12 is performed to prepare the data sheet DS1 only in the steady period, and the data sheet DS1 is not prepared in a period other than the steady period. After the manipulating lever 21 returns to the neutral position, the controller 31 performs the processes in Steps S4 to S7 in FIG. 7, based on the data sheet DS1 (that is, detection signals from the sensors 17v, 17t, 17r, and 17p in the steady period) stored in the storage unit 31b. In this manner, the erroneous determination can be prevented.

It is desirable that a time difference between the "previous time" and the "current time" in Step S72 is sufficiently longer than the "unit time" in Step S83. That is, the fluctuation range $\Delta R$ of the motor rotation speed per unit time indicates a variation in the motor rotation speed in a short period (for example, several milliseconds to several seconds). On the other hand, the difference $\Delta Q$ in Step S72 indicates a difference in the drain flow rate correction values Q separated by a certain period (for example, several tens of seconds to several hours).

In addition, in Modification Example 4, an example has been described as follows. A period in which the fluctuation range ΔR per unit time of the motor rotation speed is smaller than the threshold value $R_{th}$, is specified as the steady period. However, as long as a period in which the fluctuation range of the outflow amount per unit time of the drain flow rate is smaller than the threshold value can be specified, a specific method for specifying the steady period is not limited to the above-described example. As another example, the controller 31 may perform the process in Step S85 in a case where a fluctuation range ΔV per unit time of the drain flow rate detected by the drain flow rate sensor 17v is smaller than a threshold value $V_{th}$.

As still another example, the controller 31 may repeatedly perform the process in Step S85 at a predetermined time interval after a predetermined time elapses from when the manipulating lever 21 starts to be manipulated (that is, the traveling motor 17 starts to rotate), and may complete the process in Step S85 at a timing in which the manipulating lever 21 returns to the neutral position. In this manner, at least the influence of the drain when actuated and the drain when stopped can be eliminated.

In Modification Example 4, an example has been described in which the processes in Steps S4 to S7 in FIG. 7 are performed after the manipulating lever 21 returns to the neutral position. However, a timing for performing the processes in Steps S4 to S7 in FIG. 7 is not limited to the above-described example. As another example, in Step S85, the controller 31 may perform the processes in Steps S4 to S7 in FIG. 7. In this manner, the abnormality of the traveling motor 17 can be determined on a real time basis.

In addition, in Modification Example 4, an example has been described as follows. The logging process starts at a timing in which the manipulating lever 21 is manipulated from the neutral position, and the logging process is completed at a timing in which the manipulating lever 21 returns to the neutral position. However, the logging process is also applicable to a construction machine equipped with autonomous driving and remote driving functions. In this case, for example, the controller 31 may start the logging process at a timing of receiving a drive start signal of the actuator, and may complete the logging process at a timing of receiving a stop signal of the actuator.

Furthermore, a process of determining the abnormality of the traveling motor 17 has been described in Modification Example 4. However, the logging process illustrated in FIG. 12 is also applicable to a process of determining the abnormality of the derricking motor 18, the hoisting motor 19, and other actuators.

The processes in Steps S82 to S84 in FIG. 12 are also applicable to the failure prediction diagnosis process in FIG. 10. For example, while the crane 1 is operated, the controller 31 may prepare the data sheet DS1 at every predetermined time interval, and may store the data sheet DS1 in the storage unit 31b.

In Step S71, the controller 31 may select two data sheets DS1 prepared in the steady period in which the fluctuation range ΔR of the motor rotation speed per unit time is smaller than the threshold value $R_{th}$, out of the plurality of data sheets DS1 stored in the storage unit 31b. The controller 31 may perform the process subsequent to Step S72 by using the two selected data sheets DS1. In the two selected data sheets DS1, it is desirable that a prepared time interval is sufficiently longer than the above-described "unit time".

The present invention is not limited to the above-described embodiment, and various modifications can be made within the scope not departing from the concept of the present invention. All technical matters included in the technical idea described in the appended claims are subjects of the present invention. Although the above-described embodiment proposes preferable examples, those skilled in the art can realize various alternative examples, correction examples, modification examples, or improvement examples from the contents disclosed in the present specification. These are included in the technical scope described in the appended claims.

For example, the drain flow rate correction value Q is calculated by using the correction value table 70. However, the controller 31 may calculate the drain flow rate correction value Q each time by substituting the acquired sensor data into a predetermined mathematical expression. In addition, in a case of embodying the present invention, the failure prediction diagnosis process in Step S7 in FIG. 7 is not always essential.

In addition, in the above description, the mobile crane which is an example of the construction machine has been described. However, without being limited thereto, the present invention is also applicable to other construction machines such as a hydraulic excavator and a wheel loader. In addition, as an example of the hydraulic actuator, the traveling motor 17, the derricking motor 18, and the hoisting motor 19 have been described. However, as a matter of course, the present invention is applicable to various hydraulic actuators mounted on the construction machines.

It should be understood that the invention is not limited to the above-described embodiment, but may be modified into various forms on the basis of the spirit of the invention. Additionally, the modifications are included in the scope of the invention.

What is claimed is:

1. A construction machine including a hydraulic system having a hydraulic pump, and a first hydraulic actuator and a second hydraulic actuator which are driven by hydraulic oil supplied from the hydraulic pump, the construction machine comprising:
    a first flow rate detector that detects a flow rate of drain hydraulic oil discharged from the first hydraulic actuator;
    a second flow rate detector that detects a flow rate of drain hydraulic oil discharged from the second hydraulic actuator; and
    an abnormality determination unit that determines abnormality of the first hydraulic actuator, based on a detection signal from the first flow rate detector, and determines abnormality of the second hydraulic actuator, based on a detection signal from the second flow rate detector,
    wherein the first flow rate detector and the second flow rate detector each have a moving body disposed inside a flow path of the drain hydraulic oil and biased in a direction of blocking a flow of the drain hydraulic oil, and an output unit that outputs a detection signal according to a movement amount of the moving body.

2. The construction machine according to claim 1, further comprising:
    a first temperature detector that detects a temperature of the drain hydraulic oil discharged from the first hydraulic actuator; and
    a second temperature detector that detects a temperature of the drain hydraulic oil discharged from the second hydraulic actuator,
    wherein the abnormality determination unit determines the abnormality of the first hydraulic actuator, based on the flow rate of the drain hydraulic oil which is detected by the first flow rate detector and the temperature of the drain hydraulic oil which is detected by the first temperature detector, and determines the abnormality of the second hydraulic actuator, based on the flow rate of the drain hydraulic oil which is detected by the second flow rate detector and the temperature of the drain hydraulic oil which is detected by the second temperature detector.

3. The construction machine according to claim 2, wherein based on a table in which a relationship between the temperature of the drain hydraulic oil and the flow rate of the drain hydraulic oil is determined in advance, the abnormality determination unit corrects the flow rate of the drain hydraulic oil which is detected by the first flow rate detector or the second flow rate detector.

4. The construction machine according to claim 2, wherein the first temperature detector is disposed on a downstream side in the flow of the drain hydraulic oil from the first flow rate detector.

5. The construction machine according to claim 1, further comprising:
a merging temperature detector that detects a temperature of merging drain hydraulic oil after the drain hydraulic oil discharged from the first hydraulic actuator and the drain hydraulic oil discharged from the second hydraulic actuator merge with each other,
wherein the abnormality determination unit determines the abnormality of the first hydraulic actuator, based on the flow rate of the drain hydraulic oil which is detected by the first flow rate detector and the temperature of the merging drain hydraulic oil which is detected by the merging temperature detector, and determines the abnormality of the second hydraulic actuator, based on the flow rate of the drain hydraulic oil which is detected by the second flow rate detector and the temperature of the merging drain hydraulic oil which is detected by the merging temperature detector.

6. The construction machine according to claim 5, further comprising:
a hydraulic oil tank which stores the hydraulic oil to be supplied to the first hydraulic actuator and the second hydraulic actuator, and into which the merging drain hydraulic oil flows,
wherein the merging temperature detector detects the temperature of the hydraulic oil of the hydraulic oil tank.

7. The construction machine according to claim 1, wherein the first flow rate detector is connected to the first hydraulic actuator via a flexible pipe through which the drain hydraulic oil discharged from the first hydraulic actuator passes.

8. The construction machine according to claim 7, further comprising:
a first flow path through which the drain hydraulic oil discharged from the first hydraulic actuator passes;
a second flow path through which the drain hydraulic oil discharged from the second hydraulic actuator passes; and
a drain merging section in which the first flow path and the second flow path merge with each other,
wherein the first flow rate detector and the drain merging section have higher rigidity than that of the pipe,
the drain merging section is supported by a construction machine main body, and
the first flow rate detector is disposed on the first flow path, and is supported by the drain merging section.

9. The construction machine according to claim 8, wherein the first flow rate detector is disposed in a portion extending in a longitudinal direction of the first flow path.

10. The construction machine according to claim 1, wherein the first hydraulic actuator is a hydraulic motor, and
the abnormality determination unit determines abnormality of the hydraulic motor, based on the detection signal from the first flow rate detector after a predetermined time elapses from when the hydraulic motor starts to rotate.

11. The construction machine according to claim 1, wherein the first hydraulic actuator is a hydraulic motor, and
the abnormality determination unit determines abnormality of the hydraulic motor, based on the detection signal from the first flow rate detector during a steady period in which a fluctuation range of an outflow amount per unit time of the drain hydraulic oil discharged from the hydraulic motor is smaller than a threshold value.

12. The construction machine according to claim 11, further comprising:
a rotation speed detector that detects a rotation speed of the hydraulic motor,
wherein as the steady period, the abnormality determination unit specifies a period in which a fluctuation range of the rotation speed detected by the rotation speed detector is smaller than a threshold value.

* * * * *